US008966392B2

(12) United States Patent
Antony et al.

(10) Patent No.: US 8,966,392 B2
(45) Date of Patent: Feb. 24, 2015

(54) EVENT MANAGEMENT APPARATUS, SYSTEMS, AND METHODS (75) Inventors: John Melvin Antony, Herndon, VA (US); Paul Apostolescu, Ashburn, VA (US); Pattabiraman Srinivasan, North Potomac, MD (US); Prathap Adusumilli, Herndon, VA (US); Usman Choudhary, Springfield, VA (US)

(73) Assignee: Novell, Inc., Provo, UT (US)

( * ) Notice: Subject to any disclaimer, the term of this patent is extended or adjusted under 35 U.S.C. 154(b) by 771 days.

(21) Appl. No.: 13/219,843

(22) Filed: Aug. 29, 2011

(65) Prior Publication Data

US 2013/0055145 A1 Feb. 28, 2013

(51) Int. Cl.
G09G 5/14 (2006.01)
G05B 19/418 (2006.01)
G05B 23/02 (2006.01)
H04L 29/06 (2006.01)

(52) U.S. Cl.
CPC ........ G05B 19/41875 (2013.01); G05B 23/024 (2013.01); H04L 63/1408 (2013.01)
USPC ............. 715/781; 715/780; 715/733; 726/22; 726/23; 705/37; 345/418; 345/440

(58) Field of Classification Search
CPC ....................................................... G09G 5/14
USPC ........................................................ 715/781
See application file for complete search history.

(56) References Cited

U.S. PATENT DOCUMENTS

| | | | | |
|---|---|---|---|---|
| 5,347,452 A * | 9/1994 | Bay, Jr. | ............................ | 705/37 |
| 6,453,731 B1 * | 9/2002 | Yaegashi | .................... | 73/114.52 |
| 6,975,963 B2 * | 12/2005 | Hamilton et al. | ............. | 702/182 |
| 7,218,325 B1 * | 5/2007 | Buck | ........................... | 345/440.2 |
| 7,348,979 B2 * | 3/2008 | Tso | ............................... | 345/440 |
| 7,539,147 B2 * | 5/2009 | Chang et al. | .................. | 370/242 |
| 7,739,211 B2 * | 6/2010 | Coffman et al. | ................ | 706/45 |
| 8,185,467 B2 * | 5/2012 | Friesen et al. | .................. | 705/37 |
| 8,204,637 B1 * | 6/2012 | Everson et al. | ................ | 701/15 |
| 8,245,297 B2 * | 8/2012 | Lim | ................................ | 726/23 |
| 8,374,952 B2 * | 2/2013 | Friesen et al. | .................. | 705/37 |
| 8,407,798 B1 * | 3/2013 | Lotem et al. | .................... | 726/25 |
| 8,502,822 B2 * | 8/2013 | Rabin | ........................... | 345/440 |
| 8,510,252 B1 * | 8/2013 | Gargi et al. | ..................... | 706/52 |
| 8,520,000 B2 * | 8/2013 | Duncker et al. | .............. | 345/440 |
| 8,537,161 B2 * | 9/2013 | Buck | ........................... | 345/440.2 |
| 8,601,575 B2 * | 12/2013 | Mullarkey et al. | .............. | 726/22 |
| 8,688,564 B2 * | 4/2014 | Friesen et al. | .................. | 705/37 |
| 2004/0181664 A1 * | 9/2004 | Hoefelmeyer et al. | ....... | 713/157 |
| 2004/0250133 A1 * | 12/2004 | Lim | ............................. | 713/201 |
| 2006/0098579 A1 * | 5/2006 | Chang et al. | .................. | 370/242 |
| 2007/0094729 A1 * | 4/2007 | Hoefelmeyer et al. | ......... | 726/23 |
| 2007/0204034 A1 * | 8/2007 | Rexroad et al. | .............. | 709/224 |
| 2008/0109730 A1 * | 5/2008 | Coffman et al. | .............. | 715/733 |

(Continued)

*Primary Examiner* — Reza Nabi
(74) *Attorney, Agent, or Firm* — Schwegman Lundberg & Woessner, P.A.

(57) ABSTRACT

Apparatus, systems, and methods may operate to generate a reference statistical model of an operating system, such as a computer system, and display the reference statistical model as a hierarchical, segmented time series event stream graph, along with a graph representing current behavior of the system. The event stream graph may be derived from one or more streams of security events. Additional operations may include receiving requests to display further detail respecting discrepancies between the reference statistical model and the current behavior. Other apparatus, systems, and methods are disclosed.

17 Claims, 5 Drawing Sheets

(56) References Cited

U.S. PATENT DOCUMENTS

| | | |
|---|---|---|
| 2008/0250497 A1* | 10/2008 | Mullarkey et al. ............... 726/22 |
| 2009/0030753 A1* | 1/2009 | Senturk-Doganaksoy et al. ................................ 705/7 |
| 2009/0132953 A1* | 5/2009 | Reed et al. .................... 715/781 |
| 2010/0220910 A1* | 9/2010 | Kaucic et al. ................. 382/131 |
| 2011/0182495 A1* | 7/2011 | Sun et al. ...................... 382/141 |
| 2011/0184901 A1* | 7/2011 | Lommock et al. .............. 706/47 |
| 2011/0231361 A1* | 9/2011 | Patchava et al. .............. 707/602 |
| 2012/0260209 A1* | 10/2012 | Stibel et al. .................... 715/780 |
| 2013/0046721 A1* | 2/2013 | Jiang et al. ...................... 706/47 |
| 2013/0055145 A1* | 2/2013 | Antony et al. ................. 715/781 |
| 2013/0055339 A1* | 2/2013 | Apostolescu et al. ............. 726/1 |
| 2013/0055385 A1* | 2/2013 | Antony et al. .................. 726/22 |
| 2013/0312101 A1* | 11/2013 | Lotem et al. .................... 726/25 |

* cited by examiner

EVENT MANAGEMENT APPARATUS, SYSTEMS, AND METHODS

BACKGROUND

As part of many processes, including the operation of a data processing system, security analysts monitor events that occur. Such monitoring may be used to detect anomalous events, such as a breach of the system security, including those known by persons of ordinary skill in the art as a "security event". Security event management (SEM) systems may be used to provide limited visual cues to alert security analysts to the existence of such anomalies. These cues usually take the form of simple event count charts.

SUMMARY

In various embodiments, apparatus, systems, and methods that support event management, such as security event management, are provided. In some embodiments, activities include generating a reference statistical model of an operational system (e.g., an operating computer system), and displaying the reference statistical model as a hierarchical, segmented time series event stream graph, along with a graph representing current behavior of the system. The event stream graph may be derived from one or more streams of security events. Additional activities may include receiving requests to display further detail, including hierarchical detail, respecting discrepancies between the reference statistical model and the current behavior. Other embodiments are described, and along with the foregoing examples, will be set forth in detail below.

DETAILED DESCRIPTION

A security operations center may use several monitors to display various views that attempt to convey the operational state of one or more processes, such as an operational data processing system. A security analyst monitoring these views creates mental models of what is normal, and what is not. These mental models are not usually driven by specific instances of system behavior, but by patterns derived through experience. To explore apparent deviations from the norm, analysts often rely on additional tools and reports to decide how to spend scarce/expensive resources in order to discover the root of the problem.

Unfortunately, the visual cues afforded to system administrators by conventional SEM systems do not operate to dynamically classify anomalous events, or to link aggregated event counts to attributes of interest. In addition, no reference models are provided for comparison, to assist the analysts in creating their mental models.

To address some of the challenges noted above, among others, event management can be implemented to provide a graphic indication of normal and abnormal operations. Anomalous events can be dynamically classified in a hierarchy so that analysts are given visibility not only into statistical deviations from normalcy, but into potential contributing factors.

In some embodiments, apparatus, systems, and methods are provided for visual, real-time anomaly detection using statistical models. This can be accomplished by comparing reference statistical models with a current statistical model of the system along various security categories and metrics, to visually detect anomalies.

Statistical streams of events pertaining to specific, arbitrarily deep, hierarchical categories are acquired to statistically model the current state of the system. This model, when compared to various historical, inferred, or predictive reference models, provides cues to the occurrence of anomalies. The presence of a hierarchy in the categorization helps with determining contributing factors at every level of evaluation. The model of the current state also incorporates attributes of interest for every category providing rich details relevant to the statistical streams. Finally, the model incorporates the notion of "state time" which provides the ability to recreate the temporal state of all models at different times, so that the condition of the monitored process over ranges of state time may be selected, and viewed. These views can be reified as time series views, statistical panels, and lists of contextual attribute information that work together to improve the quality of anomaly indications.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 1:
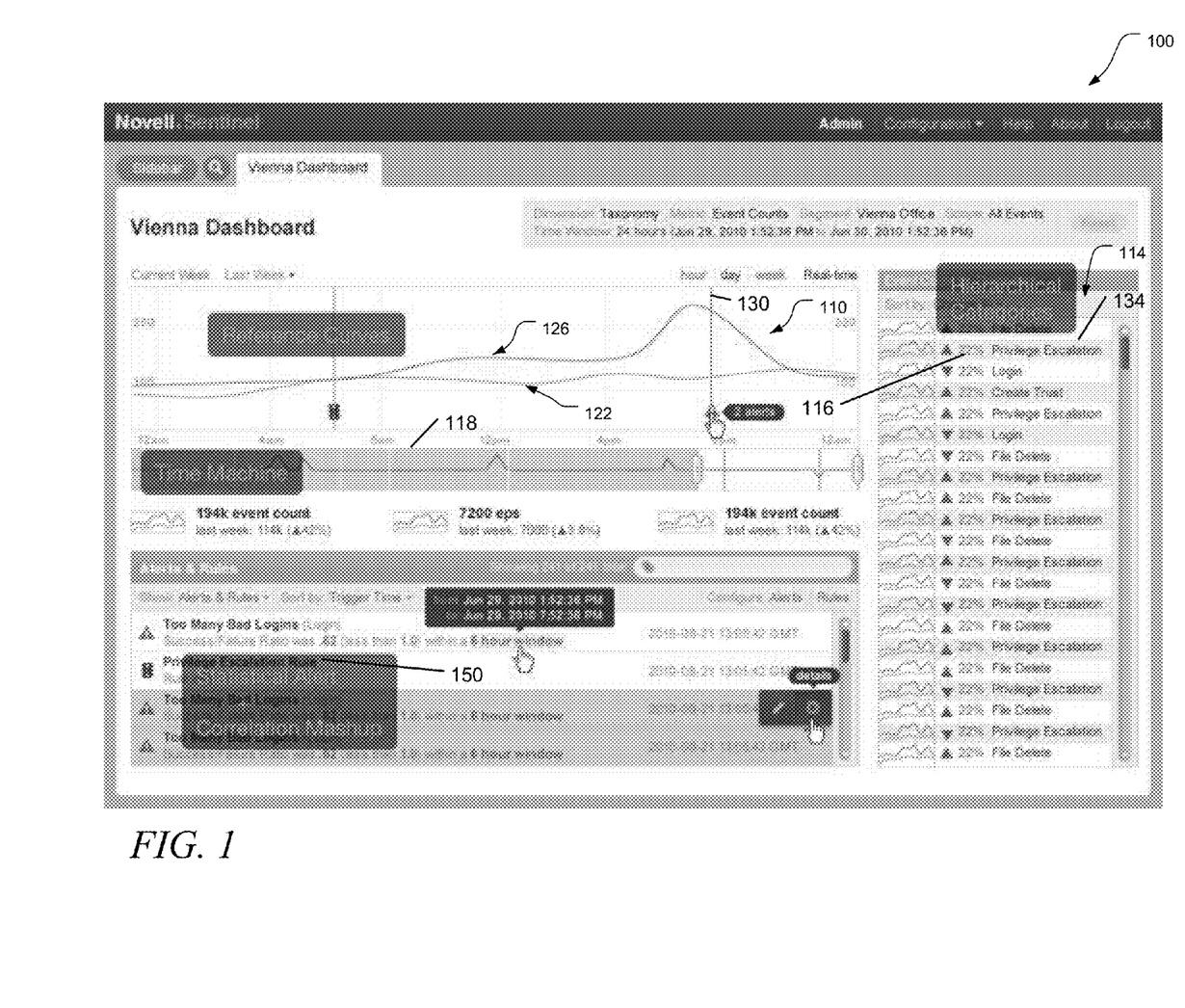
FIG. 1 is a graphical user interface (GUI) illustrating a superposition of event stream graphs for multiple event categories according to various embodiments of the invention.

FIG. 1 is a graphical user interface (GUI) 100 illustrating a superposition of event stream graphs 110 for multiple event categories 114 according to various embodiments of the invention. In this case, the graphs 110 are shown with an overview of the corresponding categories 114, along with a time machine 118 (that can be used to select a range of state time for a more detailed graphic view of events).

It should be noted that while the specific mechanism described herein reifies the current and reference system models as a time series, various embodiments are not to be so limited. That is, statistical modeling is not limited to time series—other modeling techniques may be used. Thus, the examples illustrated are shown to simplify the explanation of the operation of various embodiments, since it is relatively easy to model normal behavior as a collection of univariate time series, along a variety of corresponding categories.

There are several components that can work together to provide the functionality described. These include the acquisition of data streams, storage of the streams as time series, implementing a categorical hierarchy, tracking contextual attributes, and a time machine display with selectable compression/expansion. The function of each component will now be described in conjunction with FIG. 1 and FIG. 2.

System events, including security events, can be acquired from a variety of sources. Such events include login attempts, virtual machine instantiation, running specific applications, requesting data from specific databases, etc. These event streams can be converted into segmented, categorized statistical streams.

The categorized statistical streams can be stored as a time series, which provides a way to compare data for different segments of the time series, and/or to compare different statistics derived from the time series. The superposition of these different statistical streams, along with reference streams, rendered as visible graphs 110 forming part of a GUI, enables the rapid visual detection of anomalies as they relate to categories of interest.

In this case, a reference model graph 122 (e.g., taken from historical data) is shown in superposition with the current behavior graph 126 (e.g., taken from data acquired and displayed in real-time). It should be noted that reference curves displayed for analysis are not limited to historical models. In some embodiments, predictive or calculated reference curves may also be shown.

Upon viewing the graphs 110, the appearance of anomalous behavior is readily apparent as a divergence between the graphs at time 130. At this point, the analyst may decide that the category of privilege escalation 134 bears more detailed investigation, based on the deviation of bad login alerts and the relatively high ranking of the privilege escalation category event counts among all other categories displayed as part of the GUI 100. Since the categorized data is hierarchical, it is possible to drill down into sub-categories and their related statistical streams. A more detailed view can aid, for example, in determining the factors that contribute to a particular anomaly.

Figure 2:
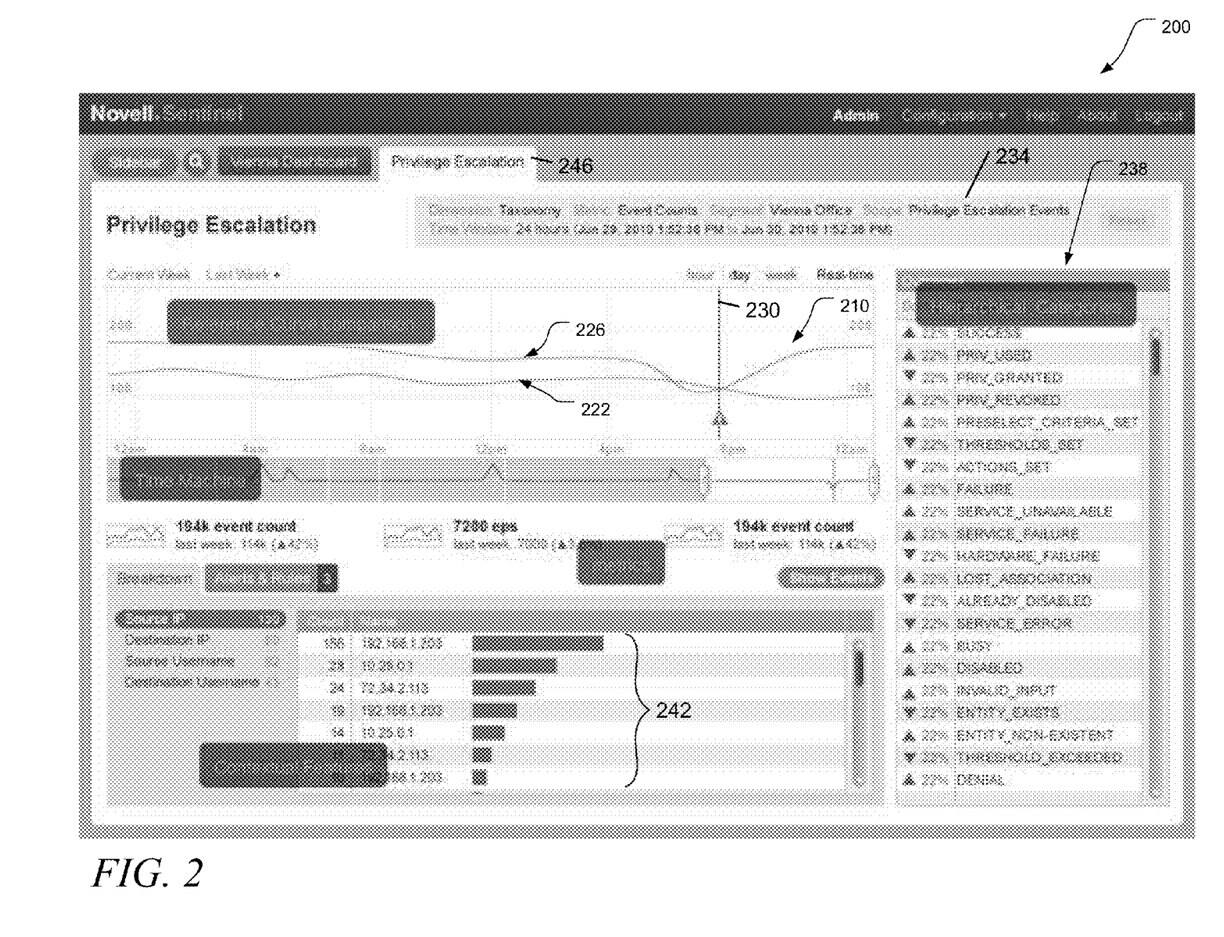
FIG. 2 is a GUI illustrating a detailed view of graph superposition for the privilege escalation event category according to various embodiments of the invention.

FIG. 2 is a GUI 200 illustrating a detailed view of graph superposition for the privilege escalation event category 234 according to various embodiments of the invention. Here the reference and current behavior model graphs 210 for privilege escalation events are shown, along with details for a variety of sub-categories 238 associated with privilege escalation events, and their contextual attributes 242.

As shown in FIG. 2, the GUI 200 can be tabbed 246 to provide a dashboard, including a statistical view that enables analysts to perform statistical analysis on a subset of security events using a classification algorithm. When the analyst creates a view, a filter is specified, and a classifier is selected—perhaps from a dropdown menu. The filter ensures that only events matching that filter will be forwarded to the classification algorithm. The classification algorithm processes the events it receives, and creates hierarchical categories over which time series are generated and displayed for analysis.

In some embodiments, tabs 246 can be used to target a specific area, such as a specific office or grouping of personnel in an organization (e.g., purchasing; receiving; accounting; or role responsibility in a development office, such as a visitor, tester, engineer, or manager). The combination of events that are selected provides a specific statistical segment to be analyzed.

As a more concrete example, consider a time series for privilege escalation events associated with financial asset system operations (e.g., payment card industry (PCI) data processing system). The acquired event stream can be segmented to look at events associated with defined assets, using event taxonomy. The counts for privilege escalations can be displayed as a real-time (current behavior) graph 226 of the time series. A reference behavior graph 222 for privilege escalations can also be displayed, perhaps as a time series of event counts over the same period of time one week earlier, or averaged over the last four weeks, over the same time period. If the graph 226 of current behavior counts is superimposed on the reference graph 222 and visually demarcated, the analyst can immediately determine where deviations have occurred.

In this case, privilege escalations are further sub-categorized into counts for "success" and counts for "failure", among others. Drilling down into the privilege escalations category provides a detailed view of the sub-categorized counts for the time period of interest. This helps the analyst determine a contributing factor to the perceived anomaly using the sub-categories (e.g., perhaps the anomaly was caused by an increase in "failures", for a variety of reasons). For example, a success count may be related to the number of successful web site login events, while failure represents the number of failed attempts to login to the web site. A sharp rise in login failures may point to the activity of an Internet robot or some other application attempting to infiltrate a secure site.

The hierarchical nature of the GUI display in FIGS. 1 and 2 can be very useful to the security analyst. This is because deviations between the current and the reference time series (e.g., see times 130, 230 in the figures) indicate anomalous behavior in real-time, which can be further investigated via categories. The hierarchical category breakdown table displays categories 114 that together make up the display time series graph 126. Thus, the time series displayed in the dashboard GUI 100 breaks down into the various categories 114 shown in the breakdown table.

For each category 114 in the breakdown table, the statistical deviation 116 from the reference, such as averaged historical behavior, can be observed (e.g., see the graphs 210 for the category "privilege escalation"). These attributes can be made available at all levels within the hierarchy tree.

Thus, when an analyst clicks on "success" as a sub-category 238, the graphs 210 will be displayed for the current behavior and the reference time series with reference to the "success" subcategory, and the category breakdown table will show how the "success" sub-category itself breaks down into various sub-sub-categories (not shown in the figures).

If the sub-category "success" happens to be the last child in the hierarchy, the category breakdown table would offer no further information in may embodiments. However, the analyst may be informed as to the numeric event count, as well as the maximum counts, the minimum counts, and the median number of counts over the displayed time period, or some selected time period.

In some embodiments, the system provides contextual attribute information for each categorized event path. These may include attributes 242 that are specific to the category of event for which the graphs 210 are currently displayed. These attributes 242 may comprise items such as the source IP (Internet Protocol) address, the destination IP address, the user account profile, and so on. The values of attributes can be ranked in order of their frequency of occurrence, providing additional assistance to the analyst working to determine the cause of an anomaly.

For example, as shown in FIG. 2, categorized information is provided, in addition to the sub-categorized views. In this case, the analyst may be allowed to view the top ten values for the source and destination IP addresses in addition to the top ten values for user accounts addresses derived from the event stream for the period of interest. This ranking of attributes 242 assists the analyst in deciding how to spend valuable time in pursuit of the anomaly. In some embodiments, the analyst is permitted to drill further down into individual ones of the attributes, to view the events involved (not shown).

The contextual event attributes 242 provide the user with specific information about the deviation from normalcy in terms of (in this case) the source IP address, username, file-name accessed, etc. This information allows the analyst to rapidly narrow down a statistical deviation from a high level abstract concept (e.g., as shown in the graphs 110) to a set of users, a particular machine, a specific file, etc. The set of attributes provided depends on the category the analyst is investigating, and can be used to set the context for forensic analysis of statistical deviation for a specific category.

The set of attributes 242 can include anything that might be of interest as an indicator of anomalous behavior for a given category. For example, an attribute set could include a list of correlation rules (e.g., the privilege escalation rule 150 that was activated during a selected time period. Since correlation rules can be used to encode policy, the analyst will get a better understanding of specific activities within the system that were operational during the period of interest. In some embodiments, an anomaly engine applies rules as thresholds to certain categories, which are alerted when the rule is violated. A sample rule might be phrased as "inform me when email traffic takes up 90% of all traffic coming out of the network", indicating a spam mailing event, for example.

A time machine 118 can be provided to permit viewing behavior models in real time mode, or in historical mode. The time machine 118 provides the ability to re-create the state of the system at a given moment in time. All of the corresponding statistical models (e.g., in the form of a graphic time series), along with metrics and contextual attributes at all levels in the hierarchy can be re-created, providing the analyst with a view into the state of the system at some particular time of interest. The ability to go back in time to view system activity is related to the amount of storage available, and the retention policy used in conjunction with the deployed system. Predictive viewing, using predictive extrapolation of the current behavior model, is also possible.

The ability to view the state of the system for any period (constrained by retention policies) is a powerful addition to the other tools provided. The analyst can traverse the hierarchy backwards and forwards in time, to give a continuous view of anomaly activity and investigation. Thus, the time machine "state of the system" includes the sub-categorized views, and the related information described above.

For the purposes of this document, a "process" is an interrelated set of computer system activities (e.g., data entry, login, file create, change, store, access, delete) that generate events (the conjunction of an activity, a role for the acting entity, and the object that's acted upon). Events thus arise from the activity of an entity associated with a role, acting on an object.

Inferences can be drawn from a process, such as what should be happening within secure, vulnerable, and exploited machines; or whether the volume of data on an exploited network equates to normal behavior (e.g., five Gbytes of data received per hour), or abnormal behavior (five Gbytes of data received per minute). Therefore, many additional embodiments may be realized.

Figure 3:
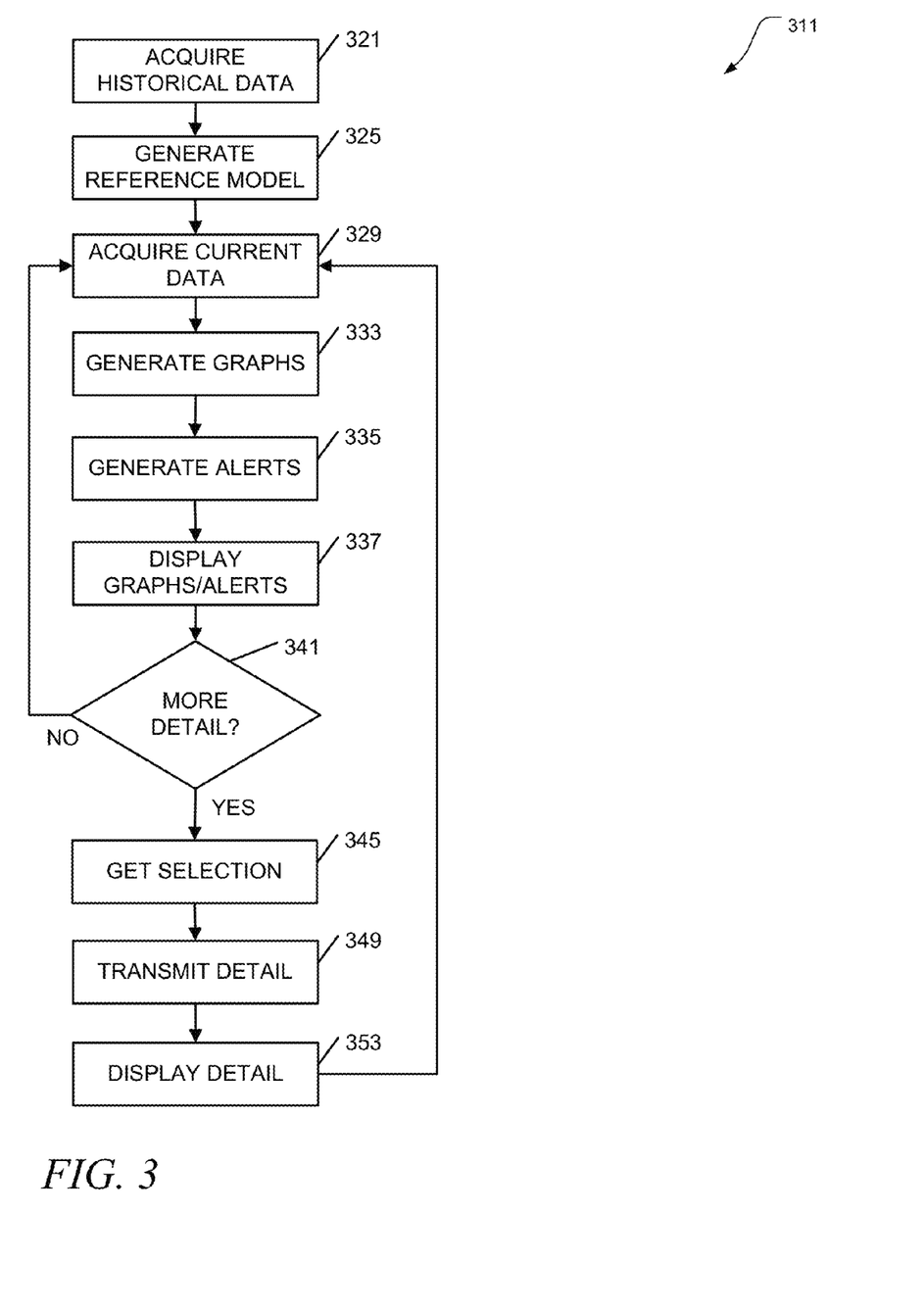
FIG. 3 is a flow diagram illustrating methods of operation according to various embodiments of the invention.

For example, FIG. 3 is a flow diagram illustrating methods 311 of operation according to various embodiments of the invention. The methods 311 are implemented in a machine-accessible and readable medium, and are operational over processes within and among networks. The networks may be wired, wireless, or a combination of wired and wireless. The methods 311 may be implemented as instructions, which when executed by a specific machine, operate to perform the processing depicted in FIG. 3.

Some embodiments include generating a reference statistical model of a process, such as an operating computer system (i.e., a domain specific implementation of the method). The method 311 may include displaying the reference statistical model as a hierarchical, segmented time series event stream graph, along with a graph representing current behavior of the process (e.g., an operating computer system). Additional activity may include receiving requests to display further detail surrounding a particular category (or sub-category) in a hierarchy, the detail being associated with discrepancies between the reference statistical model and the current behavior.

Thus, a method 311 may begin at block 321 with acquiring system operational data in real time, to be stored as historical data. The historical data is used to create a reference statistical model of the system, perhaps by transforming the historical data into segmented, categorized statistical streams. Thus, the method 311 may continue on to block 325 with generating a reference statistical model of a process, such as an operating computer system. The reference statistical model of the process then serves as the basis for comparison with current behavior. For example, as noted previously, the reference statistical model may comprise an average of the data acquired over several weeks, during the same time period for the current week. These time periods, and a variety of others can be selected for display by accessing the time machine range controls (e.g., slider buttons shown in FIGS. 1 and 2).

A graph representing current behavior can be created from acquired streams of data. In this case, the streams of data are acquired in real time and immediately used to create the graph. Thus, the method 311 may include receiving a hierarchy of statistical data streams at block 329. The method 311 may continue on to block 333 with generating a graph representing current behavior from the statistical data streams that have just been acquired, and generating a graph of the reference statistical model, using historical (stored) data. The historical and real-time acquired data can be displayed directly, or processed and/or filtered according to one or more statistical algorithms (e.g., a regular or exponential moving average may be applied to the data).

In some embodiments, alerts can be published to the user console. Prior to publication, the alerts are generated. Thus, the method 311 may continue on to block 335 to include the generation of alerts (perhaps using an anomaly engine to detect deviations and/or threshold crossings in the acquired data).

The method 311 may continue on to block 337 with displaying the reference statistical model as a hierarchical, segmented time series event stream graph, along with a graph representing current behavior of the process.

The graphs may be displayed as a superposition of information, to make visual detection of anomalies easier. Thus, the activity at block 337 may include displaying the segmented time series event stream graph and the graph representing current behavior as a superposition of graphs in a GUI, such that a divergence between the graphs makes the presence of anomalies readily apparent.

The hierarchy can be published as a list of ordered categories. Thus, the GUI may comprise a list of event categories in the hierarchy, ordered according to a percentage difference between the current behavior and the reference statistical model for the categories. Other ranking metrics are possible.

The GUI may include a time machine that offers the opportunity to view process activity (reference and current) over some selected amount of time in the past, or even as predicted for the future. This tool may be offered when both reference and current behavior data are stored, and made available for later recall. The time machine timeline can be adjusted to compress or expand the display over time. Thus, in some embodiments, the GUI may comprise a compressed graphical representation of the current behavior over time, with selectable expansion viewpoints (see FIGS. 1 and 2).

In some embodiments, the process comprises multiple processes, such as those making up an operating computer system. In this case, the method 311 includes generating a reference statistical model of the operating computer system. The method 311 may further include displaying the reference statistical model as a hierarchical, segmented time series event stream graph, along with a graph representing current behavior of the operating computer system, wherein the event stream graph is derived from at least one stream of security events.

The GUI that is published may include a current display of reference/actual event activity, and a time machine display. Thus, the activity at block 337 may comprise presenting an option to view the reference statistical model and the graph representing current behavior in substantially real time, or as historical information recorded from a past time, or both.

As noted previously, alerts can be published to the user console, perhaps based on deviations within categories (for e.g. alerting when the deviation between current and reference login activity exceeds some threshold) or on interactions between categories (e.g., alerting when the success/failure ratio for a monitored activity is less than some threshold value over a give time period). Thus, the activity at block 337 may comprise publishing statistical alerts based on rules incorporating interactions between multiple categories in the hierarchy.

The graphs that are published (e.g., displayed on a client terminal display) may take many forms, including volume-based data (e.g., the number of times the same activity is repeated over a given time interval), and frequency-based data (e.g., the number of different activities that occur over a given time interval). Thus, the activity at block 337 may comprise displaying the segmented time series event stream graph to include at least one of a volume-based stream or a frequency-based stream.

Contextual event attributes can be displayed as a graph that is ordered according to frequency. Thus, the activity at block 337 may also comprise publishing contextual event attributes as a graph of the attributes ordered and numbered according to occurrence frequency (e.g., see FIG. 2).

The hierarchy can be explored by drilling down into various categories. Thus, the activity at block 337 may comprise publishing the hierarchy as a list with at least a root level (shown generally in FIG. 1), an activity level (shown as categories 114), and an outcome level (e.g., as sub-categories 238), to enable drill-down level selection.

When sub-categories are available for inspection and analysis, the system analyst may therefore make a request to view the data associated with these levels. Thus, the method 311 may continue on to block 341 to determine whether such a request has been made. If not, then the method 311 may continue on to block 329, to acquire more real time data. If so, then the method 311 may continue on to block 345 with receiving requests to display further detail in the hierarchy respecting discrepancies between the reference statistical model and the current behavior.

The requests to display discrepancies may originate in the selection of lower-level categories in the hierarchy of events. Thus, the activity at block 345 may comprise receiving at least one of the requests in response to selection of a hierarchical category of potential contributing factors.

The requests to display detail may be serviced by publication to a network client. Thus, the method 311 may go on to block 349 to include transmitting at least some of the further detail to a network interface in a client node coupled to a display.

The details of current system behavior can be published as part of the GUI. Thus, the method 311 may continue on to block 353 with publishing the further detail as part of an interactive GUI on a display, including an administrator display, a security analyst display, or a client node display.

The methods described herein do not have to be executed in the order described, or in any particular order. Moreover, various activities described with respect to the methods identified herein can be executed in repetitive, serial, or parallel fashion. The individual activities illustrated using FIGS. 1-3 can also be combined with each other and/or substituted, one for another, in various ways. Information, including parameters, commands, operands, and other data, can be sent and received in the form of one or more carrier waves. Thus, many other embodiments may be realized.

The activities shown in FIGS. 1-3 can be implemented in various devices, as well as in a computer-readable storage medium, where the methods are adapted to be executed by one or more processors. Further details of such embodiments will now be described.

Figure 4:
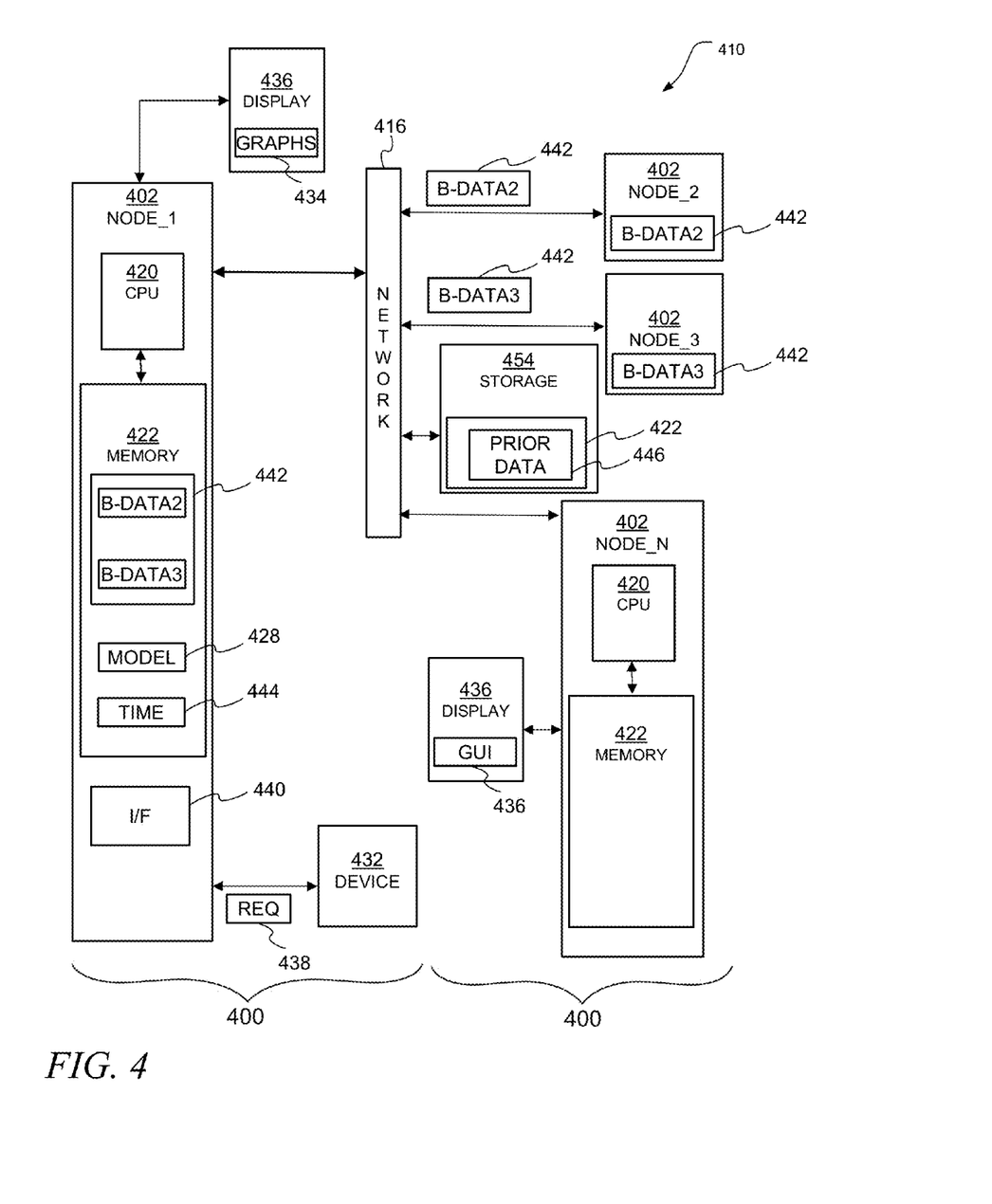
FIG. 4 is a block diagram of apparatus and systems according to various embodiments of the invention.

FIG. 4 is a block diagram of apparatus 400 and systems 410 according to various embodiments of the invention. Here it can be seen that an apparatus 400 used to provide event management, such as security event management, may comprise one or more processing nodes 402, one or more processors 420, multiple memories 422, and/or displays 436. The apparatus 400 may comprise a client, a server, or some other networked processing node.

The processing nodes 402 may comprise physical machines or virtual machines, or a mixture of both. The nodes 402 may also comprise networked entities, such as servers and/or clients. In some basic implementations, the operations described can occur entirely within a single node 402. The apparatus 400 may thus comprise a single desktop computer or server, for example, or a number of networked nodes 402.

In some embodiments, then, an apparatus 400 or system 410 may comprise interface hardware 440 to receive current behavior data 442 representing events occurring within a process, such as an operating computer system. The apparatus 400 may further comprise one or more processors 420 to generate a display of a reference statistical model 428 of the process, along with a graph representing current behavior of the process (e.g., graphs 434), wherein the reference statistical model 428 is to be displayed as a hierarchical, segmented time series event stream graph.

The processor 420 may operate to accept requests 438 to display further detail in a hierarchy respecting discrepancies between the reference statistical model 428 and the current behavior, perhaps as part of a GUI 436. Thus, the apparatus 400 or system 410 may comprise a GUI 436. The GUI 436 may be executed by a client node (e.g., NODE_N) to receive and display the hierarchy, along with the graphs 434.

Sources of behavior data can be servers, clients, storage nodes, etc. Thus, the behavior data 442 may be received from hardware processing nodes (e.g., nodes NODE_2 and NODE_3) comprising at least one of server nodes, client nodes, or storage nodes (e.g., storage unit 454).

The apparatus 400 or system 410 may comprise a time machine module 444 to recall and re-create a state of the process at a past time, to include prior metrics and prior contextual event attributes, perhaps stored as prior data 446 in a memory 422 forming part of a storage unit 454 (e.g., a disk array).

User account information can be presented in ranked format, correlated to process activity. Thus, the prior contextual event attributes may include user account activity values stored in a memory 422.

Address information can be presented in ranked format, and correlated to process activity. Thus, the prior contextual event attributes may include one or more of source address activity values or destination address activity values. These values may be stored in a memory 422 as well.

In some embodiments, the apparatus 400 may comprise a user input device 432, perhaps operating as the client node. The request 438 for further detail may originate from the user input device 432.

Processing elements and storage devices may be constructed as a single unit, or operated separately. Thus, in some embodiments, the processors 420 may be housed together with the storage unit 454. The storage unit 454 may comprise volatile memory, non-volatile memory, or a combination of the two.

A system 410 that operates to manage events may comprise multiple instances of the apparatus 400. The system 410 might also comprise a cluster of nodes 402, including physical and virtual nodes. It should be noted that any of the nodes 402 may include any one or more of the elements explicitly shown in nodes NODE_1, NODE_2, NODE_3, . . . , NODE_N, in any combination.

The nodes 402 may exist as a device embedded within another structure (e.g., as an embedded device), or as a regular desktop or laptop computer that includes a display 436 to show the activities conducted while nodes 402 are active. Thus, the apparatus 400 may also comprise a display 436 coupled to the nodes 402 to display visible indications of the activities conducted (e.g., receiving the request 438) by the nodes 402.

The apparatus 400 and system 410 may be implemented in a machine-accessible and readable medium that is operational over one or more networks 416. The networks 416 may be wired, wireless, or a combination of wired and wireless. The apparatus 400 and system can be used to implement, among other things, the processing associated with the activities illustrated in FIGS. 1-3. Modules may comprise hardware, software, and firmware, or any combination of these. Additional embodiments may be realized.

Figure 5:
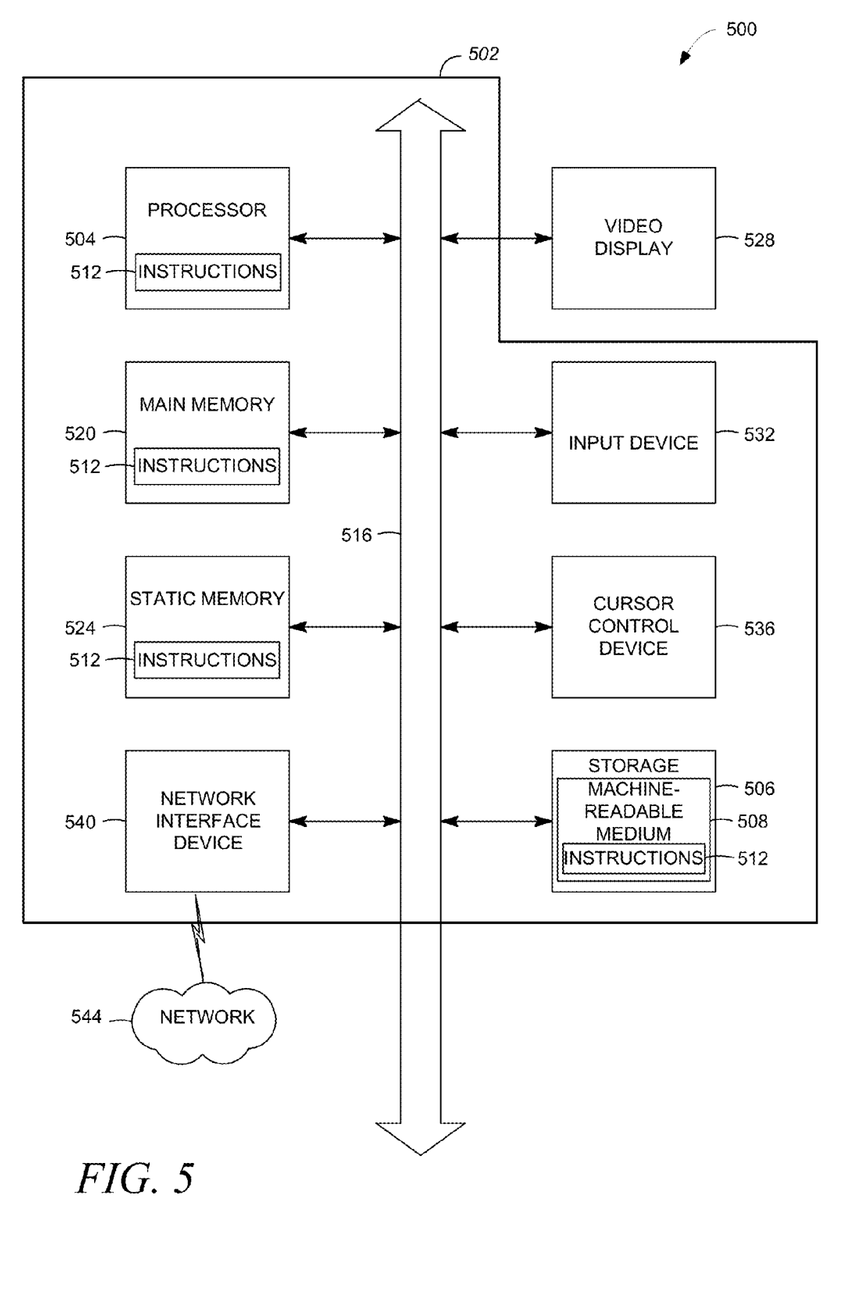
FIG. 5 is a block diagram of an article of manufacture, including a specific machine, according to various embodiments of the invention.

For example, FIG. 5 is a block diagram of an article 500 of manufacture, including a specific machine 502, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 500 of manufacture, such as a computer, a memory system, a magnetic or optical disk, some other storage device, and/or any type of electronic device or system may include one or more processors 504 coupled to a machine-readable medium 508 such as a memory (e.g., removable storage media, as well as any tangible, non-transitory memory including an electrical, optical, or electromagnetic conductor) having instructions 512 stored thereon (e.g., computer program instructions), which when executed by the one or more processors 504 result in the machine 502 performing any of the actions described with respect to the methods outlined above.

The machine 502 may take the form of a specific computer system having a processor 504 coupled to a number of components directly, and/or using a bus 516. Thus, the machine 502 may be similar to or identical to the apparatus 400 or system 410 shown in FIG. 4.

Turning now to FIG. 5, it can be seen that the components of the machine 502 may include main memory 520, static or non-volatile memory 524, and mass storage 506. Other components coupled to the processor 504 may include an input device 532, such as a keyboard, or a cursor control device 536, such as a mouse. An output device 528, such as a video display, may be located apart from the machine 502 (as shown), or made as an integral part of the machine 502.

A network interface device 540 to couple the processor 504 and other components to a network 544 may also be coupled to the bus 516. The instructions 512 may be transmitted or received over the network 544 via the network interface device 540 utilizing any one of a number of well-known transfer protocols (e.g., HyperText Transfer Protocol). Any of these elements coupled to the bus 516 may be absent, present singly, or present in plural numbers, depending on the specific embodiment to be realized.

The processor 504, the memories 520, 524, and the storage device 506 may each include instructions 512 which, when executed, cause the machine 502 to perform any one or more of the methods described herein. In some embodiments, the machine 502 operates as a standalone device or may be connected (e.g., networked) to other machines. In a networked environment, the machine 502 may operate in the capacity of a server or a client machine in server-client network environment, or as a peer machine in a peer-to-peer (or distributed) network environment.

The machine 502 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 502 is illustrated, the term "machine" shall also be taken to include any collection of machines that individually or jointly execute a set (or multiple sets) of instructions to perform any one or more of the methodologies discussed herein.

While the machine-readable medium 508 is shown as a single medium, the term "machine-readable medium" should be taken to include a single medium or multiple media (e.g., a centralized or distributed database), and/or associated caches and servers, and or a variety of storage media, such as the registers of the processor 504, memories 520, 524, and the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the various embodiments, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing events, such as security events.

For example, in many embodiments, various classification algorithms can be used to create hierarchical categories that can drive visual analysis along various dimensions. At the time of creating a particular statistical view, analysts can select an algorithm to associate with that view. That algorithm then drives the categorization of data visible to that view. N classifiers can be created, as well as N reference curves. Reference curves can be dynamically generated over time.

Most embodiments can function using any type of data stream, with classifiers added to operate on those streams. The generated stream of counts can thus be converted into different statistical streams and stored.

For example, in some embodiments, a taxonomy classifier having three levels of hierarchy is used. The first level is a root level, comprising mostly a time series of all the data visible in that view (as specified by the corresponding filter). The second level is the activity or taxonomy name level. This level generally corresponds to the type of activities being performed within the events being processed. Categories in this level include "logins" and "file deletes". The third level is the outcome level. Outcomes for each category in the second level include items such as "success", "failure", "unknown", etc. FIG. 2 shows additional examples for these sub-categories 238.

In some cases, a system to manage events, such as security events, may be designed as a pluggable system, to enhance the potential for reuse across environments.

Using the combination of the features made available by various embodiments may lead to more efficient monitoring of various process types, including an operating computer system. Increased efficiency in system administration, rapid fault detection, and better operational security may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
    interface hardware to receive current behavior data representing events occurring within a process; and
    at least one processor to:
        generate a graphical user interface (GUI) to display a reference statistical model of the process, along with a first graph representing current behavior of the process, wherein the reference statistical model is to be displayed as a hierarchical, segmented time series event stream graph;
        accept requests to display further detail in a hierarchy respecting discrepancies between the reference statistical model and the current behavior, each element in the hierarchy having a distinct corresponding reference statistical model; and
        display, in response to a request to display further detail in the hierarchy including identification of an element in a different level of the hierarchy, a second graph including the current behavior of the process corresponding to the element and a second reference statistical model corresponding to the element, the GUI enabling a time machine module to recall and re-create a state of the process at a past time, to include prior metrics and prior contextual event attributes, wherein the prior contextual event attributes include at least one of a source address activity values or destination address activity values, the values stored in a non-transitory memory.

2. The system of claim 1, wherein the GUI is executed by a client node.

3. The system of claim 1, wherein the behavior data is received from hardware processing nodes comprising at least one of server nodes, client nodes, or storage nodes.

4. The system of claim 1, wherein the prior contextual event attributes include user account activity values stored in the non-transitory memory.

5. A processor-implemented method to execute on one or more processors that perform the method, comprising:
    generating a first reference statistical model of a process including distinct reference statistical models of hierarchical elements in the process;
    displaying a graphical user interface (GUI) including the first reference statistical model displayed as a hierarchical, segmented time series event stream graph, along with a graph representing current behavior of the process; and
    receiving requests to display further detail in a hierarchy respecting discrepancies between the first reference statistical model and the current behavior; and
    displaying, in the GUI and in response to a request to display further detail in the hierarchy, a second reference statistical model corresponding to an element in the hierarchical elements in the process, the GUI enabling a time machine module to recall and re-create a state of the process at a past time, to include prior metrics and prior contextual event attributes, wherein the prior contextual event attributes include at least one of a source address activity values or destination address activity values, the values stored in a non-transitory memory.

6. The method of claim 5, further comprising:
    receiving a hierarchy of statistical data streams; and generating the graph representing the current behavior from the statistical data streams.

7. The method of claim 5, further comprising:
displaying the segmented time series event stream graph and the graph representing current behavior as a superposition of graphs in the GUI.

8. The method of claim 7, wherein the GUI further comprises:
a list of event categories in the hierarchy, ordered according to a percentage difference between the current behavior and the reference statistical model for the categories.

9. The method of claim 7, wherein the GUI further comprises:
a compressed graphical representation of the current behavior over time, with selectable expansion viewpoints.

10. The method of claim 5, wherein the receiving further comprises:
receiving at least one of the requests in response to selection of a hierarchical category of potential contributing factors.

11. A processor-implemented method to execute on one or more processors that perform the method, comprising:
generating a first reference statistical model of an operating computer system including distinct reference statistical models of hierarchical elements in the operating system;
displaying a graphical user interface (GUI) including the first reference statistical model as a hierarchical, segmented time series event stream graph, along with a graph representing current behavior of the operating computer system, wherein the event stream graph is derived from at least one stream of security events; and
receiving requests to display further detail respecting discrepancies between the first reference statistical model and the current behavior; and
displaying, in the GUI and in response to the request to display further detail in the hierarchy, a second reference statistical model corresponding to an element in the hierarchical elements in the operating system, the GUI enabling a time machine module to recall and re-create a state of the operating system at a past time, to include prior metrics and prior contextual event attributes, wherein the prior contextual event attributes include at least one of a source address activity values or destination address activity values, the values stored in a non-transitory memory.

12. The method of claim 11, further comprising:
transmitting at least some of the further detail to a network interface in a client node coupled to a display.

13. The method of claim 11, further comprising:
presenting an option to view the first reference statistical model and the graph representing current behavior in substantially real time, or as historical information recorded from a past time, or both.

14. The method of claim 11, further comprising:
publishing statistical alerts based on rules incorporating interactions between multiple categories in the hierarchy.

15. The method of claim 11, wherein the displaying comprises:
displaying the segmented time series event stream graph to include at least one of a volume-based stream or a frequency-based stream.

16. The method of claim 11, further comprising:
publishing contextual event attributes as a graph of the attributes ordered and numbered according to occurrence frequency.

17. The method of claim 11, further comprising:
publishing the hierarchy as a list with at least a root level, an activity level, and an outcome level, to enable drill-down level selection.

* * * * *